Jan. 31, 1961    P. VOLTAIRE ET AL    2,969,598
GROOVE WOBBLE AND ECCENTRICITY GAUGE
Filed May 5, 1958    2 Sheets-Sheet 2
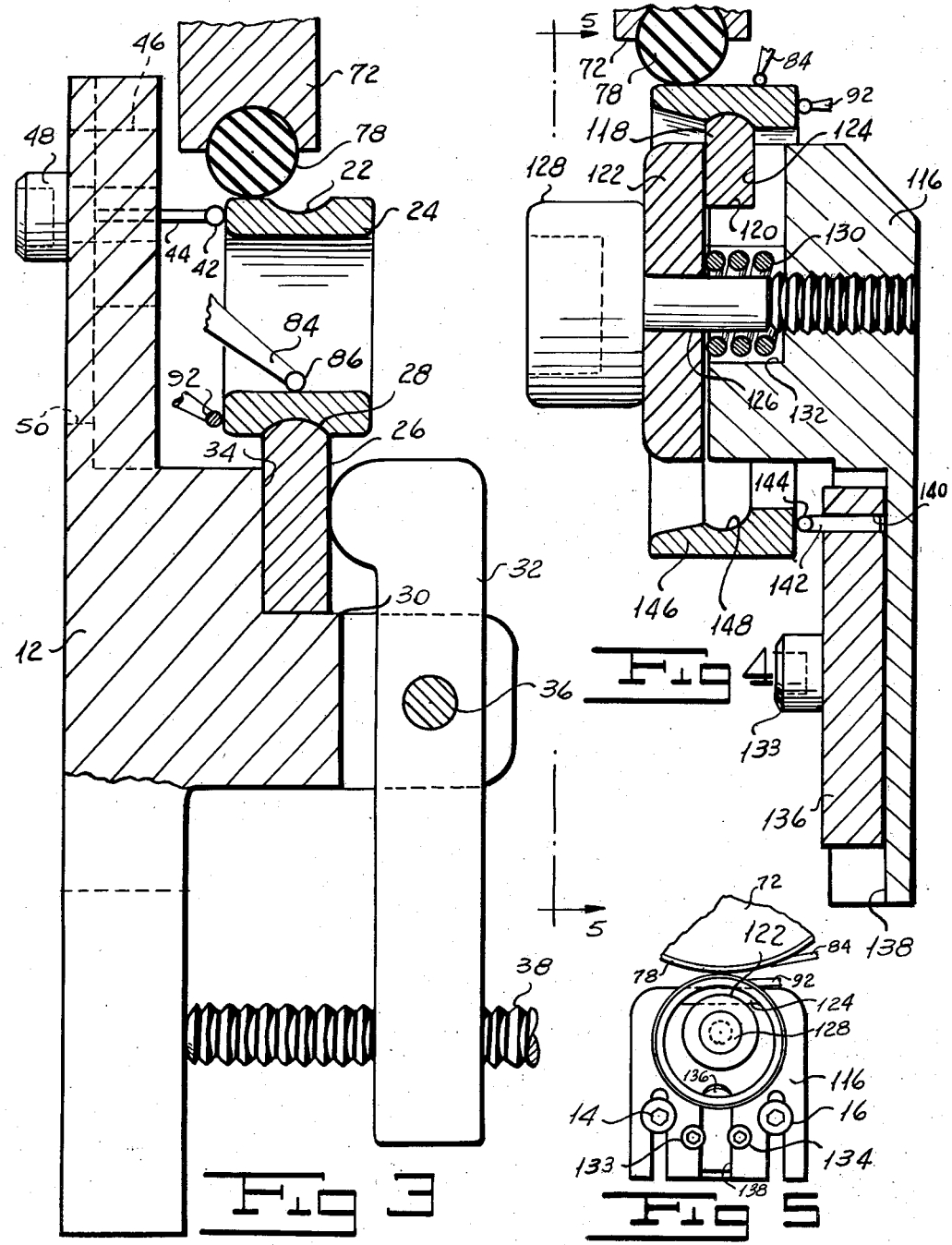
INVENTORS
PAUL VOLTAIRE
DAVID N. MENOS
BY Henry L. Shenier
ATTORNEY

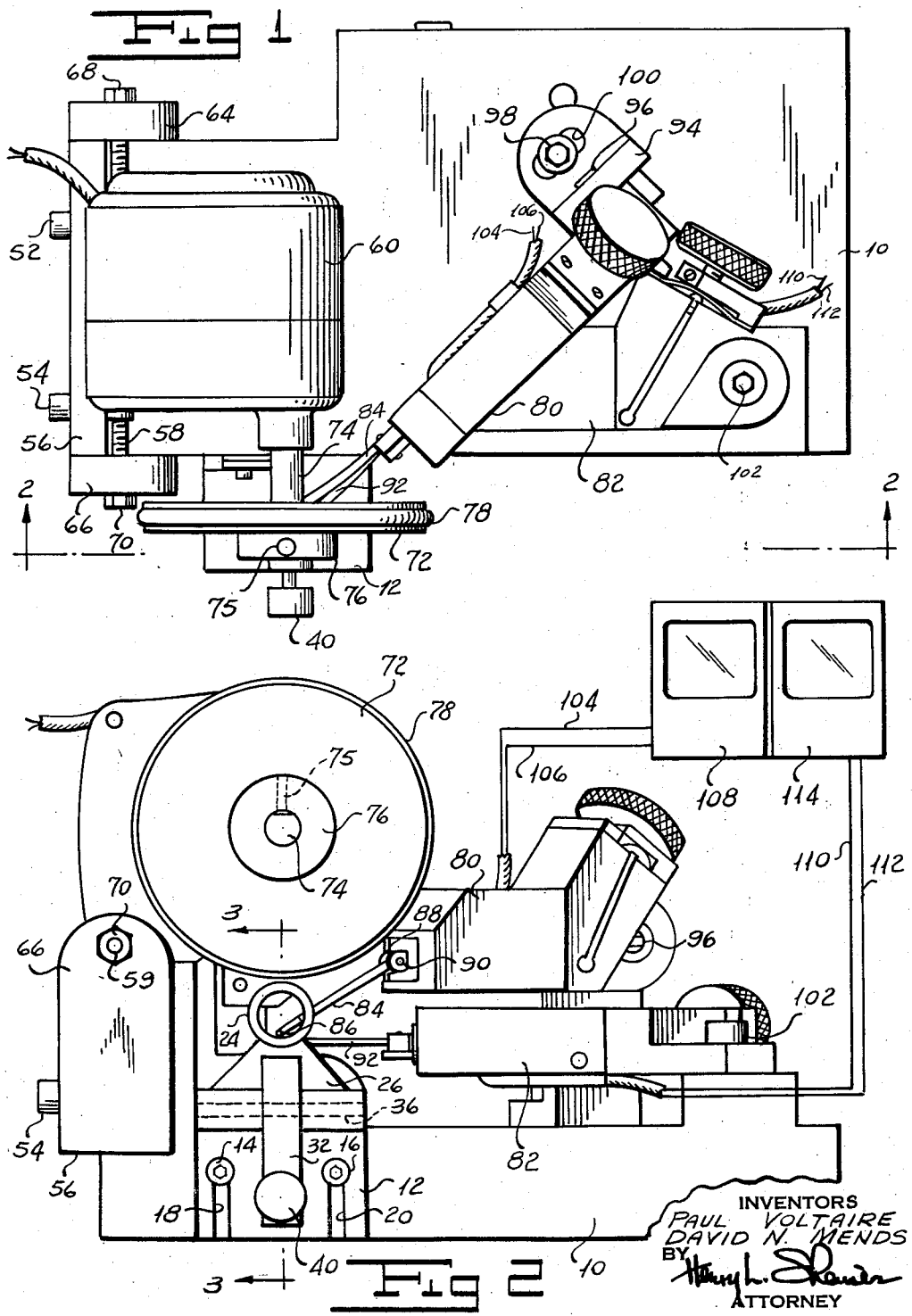

United States Patent Office 2,969,598
Patented Jan. 31, 1961

2,969,598

GROOVE WOBBLE AND ECCENTRICITY GAUGE

Paul Voltaire, New Milford, and David N. Mends, Sandy Hook, Conn., assignors to The Barden Corporation, Danbury, Conn., a corporation of Connecticut Filed May 5, 1958, Ser. No. 733,102

12 Claims. (Cl. 33—174)

Our invention relates to a groove wobble and eccentricity gauge and more particularly to an improved gauge for measuring both the wobble and the eccentricity of a bearing ring groove or race before the ring is assembled in a finished bearing.

The bearing ring grooves or races of a precision bearing must conform to a predetermined standard of trueness to be acceptable. Two characteristics of the ring groove provide a measure of the trueness of the groove. The groove "wobble" is the deviation of the groove in an axial direction from the desired true path. It may be measured by the deviation from parallelism of the plane of the race centerline from one reference face of the bearing. Axial runout of this face is an indication of groove wobble. Groove eccentricity is the deviation of the groove in a radial direction from the desired true path.

In the prior art, gauges are available for determining both the wobble and the eccentricity of assembled bearings made up of two rings having balls disposed between the rings. If either one or both the ring grooves is without the predetermined acceptable limit of wobble or of eccentricity, the bearing is rejected. All the labor which went into assembling the bearing is lost. In the great majority of cases only one of the two rings is unacceptable. However, the manufacturer must suffer the loss of the good ring and the balls, or he must break down the assembly and reassemble each ring with other components and test the two new assemblies. Clearly this procedure is an uneconomical one. The groove wobble and eccentricity test in the prior art results in a large loss to the manufacturer.

We have invented a groove wobble and eccentricity gauge which tests the trueness of a bearing ring groove before the ring is assembled to form a complete bearing. Our test eliminates the loss to the manufacturer resulting from rejection of a bearing, one of the rings of which and the balls of which are within prescribed standards. Our gauge avoids loss to the manufacturer resulting from the assembly of a defective ring into a complete bearing assembly which fails the eccentricity or wobble test performed on a gauge of the prior art. Our gauge simultaneously tests a bearing ring for both groove wobble and eccentricity.

One object of our invention is to provide a groove wobble and eccentricity gauge for testing a bearing ring before its assembly into a complete bearing.

A further object of our invention is to provide a groove wobble and eccentricity gauge for bearing rings which eliminates many of the losses to the manufacturer resulting from tests of assembled bearings made on gauges of the prior art.

A further object of our invention is to provide a groove wobble and eccentricity gauge which simultaneously measures both the wobble and the eccentricity of the groove of a bearing ring under test.

Still another object of our invention is to provide a groove wobble and eccentricity gauge which measures the groove wobble and eccentricity of both inner and outer bearing ring grooves.

Other and further objects of our invention will appear from the following description:

In general our invention contemplates the provision of a groove wobble and eccentricity gauge having a replica with a surface which conforms to a bearing groove. We mount the ring to be tested with its groove resting on the replica. We provide means for continually rotating the ring on the replica. A first transducer, responsive to movement of the ring in a radial direction produces an electrical signal which is a measure of the eccentricity of the ring groove. A second electrical transducer, responsive to axial movement of the ring, produces a second electrical signal which is a measure of the ring groove wobble. We provide suitable devices which respond to the respective electrical signals to indicate or record the groove wobble and the groove eccentricity. Our gauge measures the wobble and eccentricity of both inner and outer ring grooves.

In the accompanying drawings which form part of the instant specification and which are to be read in conjunction therewith and in which like reference numerals are used to indicate like parts in the various views:

Figure 1 is a top plan view of the form of our groove wobble and eccentricity gauge for measuring the groove wobble and groove eccentricity of an inner bearing ring.

Figure 2 is a front elevation of the form of our groove wobble and eccentricity gauge shown in Figure 1 taken along the line 2—2 of Figure 1.

Figure 3 is a sectional view of the form of our groove wobble and eccentricity gauge shown in Figure 2 taken along the line 3—3 of Figure 2 and drawn on an enlarged scale.

Figure 4 is a sectional view of a modified form of our groove wobble and eccentricity gauge for measuring groove wobble and groove eccentricity of an outer bearing ring.

Figure 5 is a front elevation of the form of our groove wobble and eccentricity gauge shown in Figure 4 taken along the line 5—5 of Figure 4 and drawn on a reduced scale.

More particularly referring now to the Figures 1 to 3 of the drawings our gauge includes a base 10 on which we mount a replica support bracket 12 by any suitable means such as respective screws 14 and 16 extending through slots 18 and 20 in the bracket 12 and screwed into the base 10 to hold the bracket 12 on the base. In this form of our invention, which measures the wobble and eccentricity of the groove or race 22 of an inner bearing ring 24, we provide the gauge with a replica 26 having a surface 28 which conforms to the groove of an inner bearing ring being tested. Advantageously, we cast the replica 26 by using the groove of the bearing ring being tested as a part of the cavity of a mold to form the surface 28. Preferably, we form the replica 26 from a material such as "Cerrolow 117," which is the registered trademark of the Cerro De Pasco Corp. for an alloy of bismuth, lead, tin, cadmium, and indium, a material which is particularly useful as a surface detail transfer medium.

The replica 26 rests on a platform or bracket 30 formed on the bracket 12. A clamping arm 32 engages the replica 26 to hold it firmly against a shoulder 34 formed on the bracket 12. We pivotally mount the arm 32 on a pin 36 carried by the bracket 12. A screw 38 threaded through the end of arm 32 remote from the replica engages bracket 12. A knob 40 permits the screw to be turned into the arm 32 to determine the pressure with which the arm engages the replica. It will be appreciated also that by turning the screw 38 out of the arm, we free the replica 26 to permit it to be removed and replaced as desired.

In operating our tester, the ring 24 to be tested is placed on the replica 26 in a slightly canted position to hold the ring firmly against a small carbide ball 42 spot-welded to a length of music wire 44 carried by a block 46 adjustably clamped in position on the bracket 12 by a screw 48 passing through a slot 50 in the bracket and threaded into the block 46. It will be appreciated that by loosening the screw 48, block 46 may be moved up and down on the bracket 12 to accommodate rings of different sizes.

Respective screws 52 and 54 secure a motor-mounting bracket 56 to the base 10. A motor-mounting stud 58 having conical depressions in its ends passes through the casing of a motor 60. Two pointed set screws 59, one of which is shown in Figure 2, threaded into respective uprights 64 and 66 on the bracket 56 engage the ends of stud 58, permitting motor 60 to swivel freely. Nuts 68 and 70 hold the set screws in position on the brackets. We mount a drive wheel 72 on the shaft 74 of the motor 60 by means of a set screw 75 passing through the hub 76 of the drive wheel. We place an O-ring 78 on the periphery of wheel 72 to engage the ring 24 to drive the ring when motor 60 is energized.

From the foregoing description it will be seen that when motor 60 is energized to drive its shaft 74, wheel 72 rotates and causes the O-ring 78 to rotate the ring 24 on the replica 26. As the ring is driven, it will move axially as its groove 22 deviates in an axial direction from the standard groove while riding on replica 26. The ring 24 will move radially as its groove 22 deviates in a radial direction from the standard groove while riding on replica 26.

We provide means for detecting motion of the ring 24 under test in an axial direction and in a radial direction. We employ a pair of respective electrical transducers indicated by the reference characters 82 and 80. These transducers may be of any suitable type known to the art. For example, they may be "Indi-Ac" heads manufactured by the Cleveland Instrument Company, or they may be Pratt and Whitney electro-limit heads. The electro-limit head is a comparator that will measure displacements, under shop and production conditions, as small as 0.00005 inch. It consists generally of a stylus or the like connected to an armature which floats midway between a pair of electromagnetic coils. The coils are so adjusted that the current is balanced when the armature is positioned centrally between them. The movement of the stylus in contact with the work to be measured produces a movement in the armature. This movement unbalances the magnetic fields and produces a corresponding unbalance in the current flowing in the coils. The amount of unbalance, which is a function of the change of position of the stylus, may be read on any suitable indicating or recording device.

We form the stylus 84 of the transducer 80, for example, from drill rod, and silver solder a carboloy feeler ball 86 to the end of the stylus 84 which is to engage the ring under test. We solder a hub 88 to the end of the stylus remote from the ball 86 and secure this hub to the element 90 of the transducer 80 which is to actuate the transducer armature. The stylus 92 of transducer 82 is similar to the stylus 84 of transducer 80. We mount the transducer 80 on a bracket 94 by means of a screw 96 in a position at which its stylus is in engagement with the inner surface of the ring. In this position the stylus 84 is responsive to radial motion of the ring 24. A screw 98 passing through a slot 100 in the base of bracket 94 and screwed into the base 10 adjustably positions the transducer 80. A screw 102 secures the transducer 82 to the base 10 in a position at which the ball of the stylus 92 of this transducer engages the periphery of ring 24 to sense movement of the ring 24 in an axial direction. As is known in the art, in response to a movement of its stylus, transducer 80, for example, produces an output electrical signal. In the arrangement shown this signal is a measure of eccentricity of the ring 24. Respective conductors 104 and 106 carry the electrical signal of transducer 80 to a suitable indicating or recording device 108. similarly, conductors 110 and 112 carry the output signal of transducer 82 to another recording or indicating device 114. Since the stylus 92 of transducer 82 is responsive to axial motion of the ring 24, the output signal of transducer 82 is a measure of the groove wobble.

Our gauge is readily adapted to determine the groove wobble and groove eccentricity of an outer bearing ring as well as of the inner bearing ring. We accomplish this result merely by loosening the screws 14 and 16, by replacing bracket 12 with the replica bracket 116 shown in Figures 4 and 5 and by changing the positions of the transducers 80 and 82 to cause their styli to engage the ring as shown in Figures 4 and 5. In this form of our invention the replica 118 rests on a platform 120 formed on the bracket 116. A clamping disk or cap 122 holds the replica 118 against a shoulder 124. A screw 126 having a head 128 is turned into the bracket 116 to force the cap 122 against the replica 118. This action is against the action of a spring 130 disposed in a bore 132 formed in the bracket 116. Screw 126 may readily be turned out of the bracket to release the replica 118 to permit it to be replaced. We form the replica 118 from Cerrolow 117 using the groove of a ring being tested as part of the cavity of a mold. A pair of screws 133 and 134 adjustably hold a block 136 in position in a recess 138 formed in the bracket 116. A bore 140 in block 136 receives a length of music wire 142, to the end of which we solder the carbide ball 144. As in the form of our invention in which inner rings are being measured we cant the outer ring 146 on replica 118 to force it against the ball 144. Block 136 may be adjusted to accommodate rings of different sizes. In this form of our invention we position the stylus 84 of transducer 80 to engage the outer surface of ring 146 to measure the eccentricity of the groove 148 of ring 146. We position the stylus 92 to engage the edge of ring 146 to cause transducer 82 to provide a measure of wobble.

In operation of our gauge, when we wish, for example, to determine the groove wobble and the groove eccentricity of an inner ring, we mount the bracket 12 on the base 10 and clamp a replica 26, having a surface 28 conforming to the groove of an inner ring being tested, on the bracket 12. We start motor 60. With motor 60 running, the O-ring 78 drives the ring 24. Stylus 84 responds to radial movement of the ring to cause transducer 80 to produce an output signal representing groove eccentricity and similarly stylus 92 responds to axial movement of the ring to indicate groove wobble.

The devices 108 and 114 conveniently may be selected to provide continuous records of these measurements. The replica may readily be replaced in the manner described hereinabove to accommodate different bearings.

When it is desired to measure the groove wobble and groove eccentricity of a bearing outer ring, we remove the bracket 12 and substitute bracket 116. We clamp a replica 118, having a surface conforming to the groove of an outer ring being tested to the bracket 116. We position the styli 84 and 92 to respond respectively to radial and to axial motion of ring 146. It will readily be appreciated that transducers 80 and 82 may be secured to base 10 at locations at which their styli may be moved to the positions shown in Figures 4 and 5. With the motor running, transducer 80 produces an output signal representing groove eccentricity and transducer 82 produces an output signal representing groove wobble. The replica 118 may of course be replaced to accommodate different bearings.

It will be seen that we have accomplished the objects of our invention. We have provided a bearing groove eccentricity and groove wobble gauge which measures the eccentricity and wobble of a bearing ring before assembly of the ring into a complete bearing. Our gauge eliminates losses to the manufacturer resulting from use of gauges of the prior art. Our gauge simultaneously measures groove wobble and groove eccentricity. Our gauge readily accommodates both inner and outer bearing rings.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A gauge for measuring the deviation of a bearing groove from a predetermined path including in combination a replica having an extended surface conforming to a portion of the surface of a bearing ring groove describing said predetermined path, said replica being stationarily positioned to support a bearing ring to be tested with the bearing groove directly in engagement with said replica surface, means for driving said ring to move said ring groove over said replica surface and means for sensing movement of said ring in response to deviation of the groove of said ring from said predetermined path.

2. A gauge as in claim 1 including means for constraining said ring to a predetermined position with respect to said replica.

3. A gauge as in claim 1 in which said replica is formed with a surface conforming to an inner bearing ring groove and in which said sensing means includes a first feeler in engagement with the inner surface of said bearing ring and a second feeler in engagement with a side of said ring.

4. A gauge as in claim 1 in which said replica is formed with a surface conforming to an outer bearing ring groove and in which said sensing means includes a first feeler in engagement with the outer surface of said ring and a second feeler in engagement with a side of said ring.

5. A gauge as in claim 1 including indicating means responsive to said sensing means.

6. A gauge for measuring the eccentricity of a bearing groove including in combination a replica having an extended surface generally conforming to a portion of the surface of a bearing groove having a predetermined configuration, said replica being stationarily positioned to support a bearing ring to be tested with the bearing groove directly in engagement with the replica surface, means for rotating said bearing ring being tested in contact with said replica to move said groove over said replica surface and means for sensing displacement of said ring in a direction perpendicular to the axis of rotation of said ring.

7. A gauge for measuring the wobble of a bearing ring groove including in combination a replica having an extended surface generally conforming to a portion of the surface of a bearing groove having a predetermined configuration, means for stationarily positioning said replica to support a bearing ring to be tested on said replica with the bearing groove surface directly in engagement with the replica surface, means for rotating said bearing ring being tested to move said ring groove over said replica surface and means for sensing displacement of said ring in a direction parallel to the axis of rotation of said ring.

8. A gauge for measuring the displacement of a bearing ring groove from a predetermined path including in combination a replica having an extended surface generally conforming to a portion of the surface of a bearing groove having a predetermined configuration, means for stationarily positioning said replica to support a bearing ring to be tested on said replica with the bearing groove surface directly in engagement with the replica surface, means for rotating said bearing ring being tested to move said ring groove over said replica surface, means for sensing displacement of said ring in a radial direction and means for sensing displacement of said ring in a direction parallel to the axis of rotation of the ring.

9. A gauge for measuring the displacement of a bearing ring groove from a predetermined path including in combination a base, a replica having a surface conforming to the surface of the groove being tested, a replica support bracket, means for removably securing said bracket on said base, means for securing said replica in a stationary position on said bracket, said replica being stationarily positioned to support a bearing ring being tested with the bearing groove surface directly in engagement with the replica surface, means for rotating said bearing ring being tested to move said ring groove over said replica surface and means for sensing displacement of said ring in response to deviation of the ring groove from said predetermined path.

10. A gauge as in claim 9 wherein said replica is formed with a surface conforming to the surface of an inner ring groove and wherein said bracket is formed with a shoulder for receiving said replica and wherein said means for securing said replica to said bracket comprises a clamping arm for releasably holding said replica on said shoulder.

11. A gauge as in claim 9 wherein said replica is formed with a surface conforming to the surface of an outer bearing ring groove and wherein said bracket is formed with a shoulder for receiving said replica and wherein said securing means includes a clamping screw for releasably holding said replica on said shoulder.

12. A gauge for measuring the deviation of a bearing groove from a predetermined path including in combination a stationary replica having a surface conforming to the surface of a bearing ring groove describing said predetermined path, means positioning said replica to support a bearing ring to be tested with the bearing ring groove directly in engagement with said replica surface, means for driving said ring on said replica to move said groove over said replica surface and means for sensing movement of said ring in response to deviation of the groove of said ring from said predetermined path.

References Cited in the file of this patent

UNITED STATES PATENTS

| 1,637,482 | Graves | Aug. 2, 1927 |
| 2,425,381 | Lovick | Aug. 12, 1947 |
| 2,601,447 | Neff | June 24, 1952 |
| 2,648,135 | Gates | Aug. 11, 1953 |
| 2,806,294 | Cargill | Sept. 17, 1957 |

FOREIGN PATENTS

| 863,849 | Germany | Jan. 19, 1953 |